Patented Dec. 20, 1938

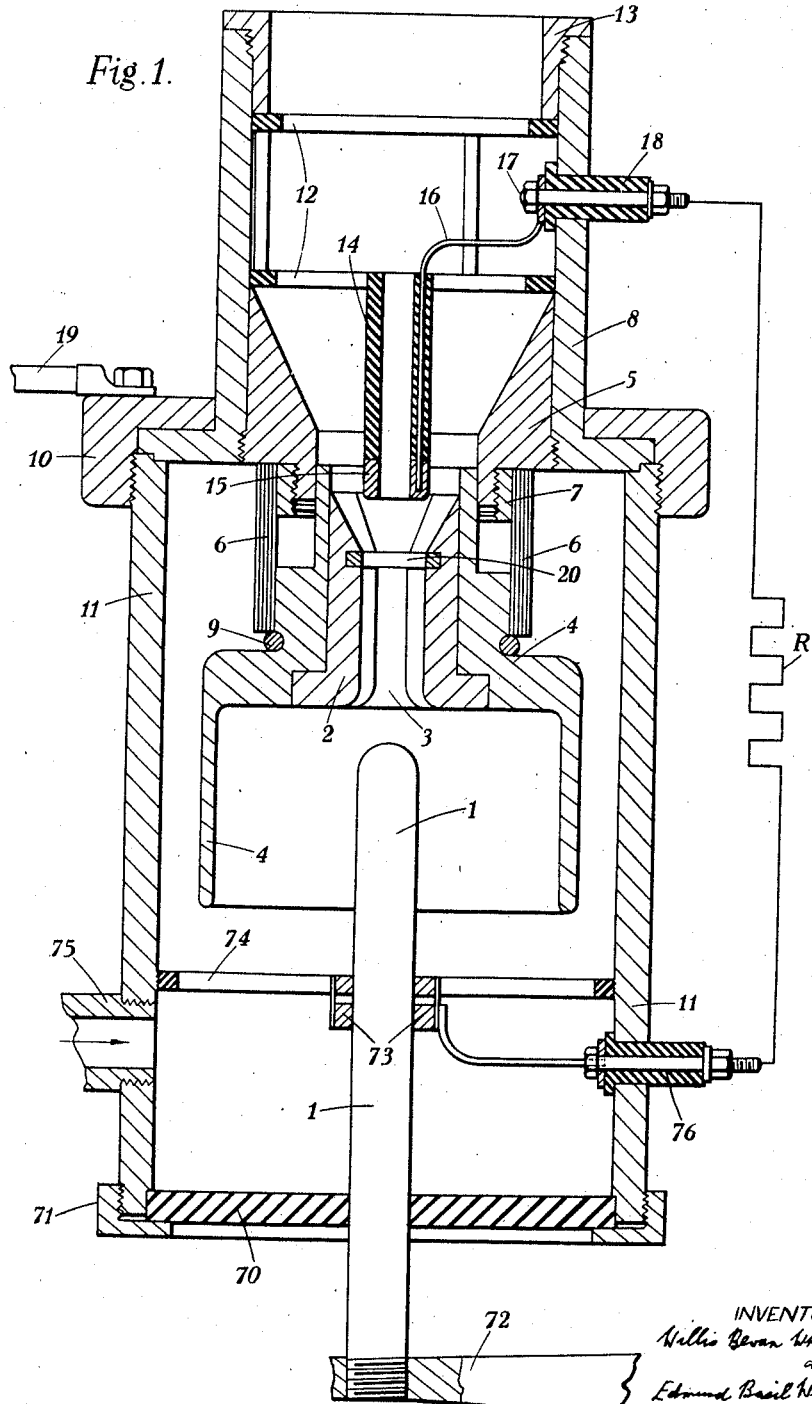

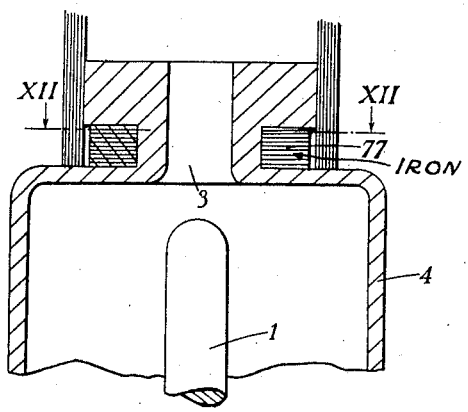
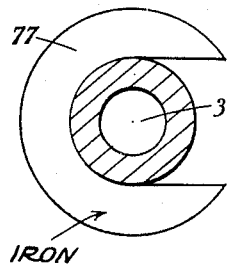
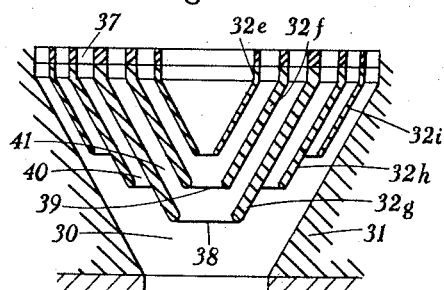
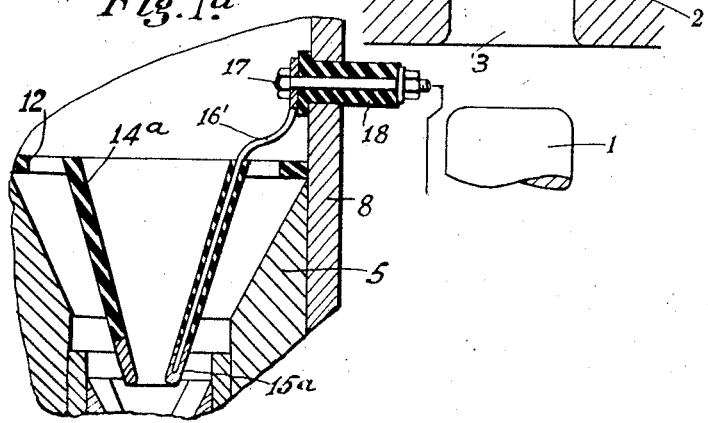

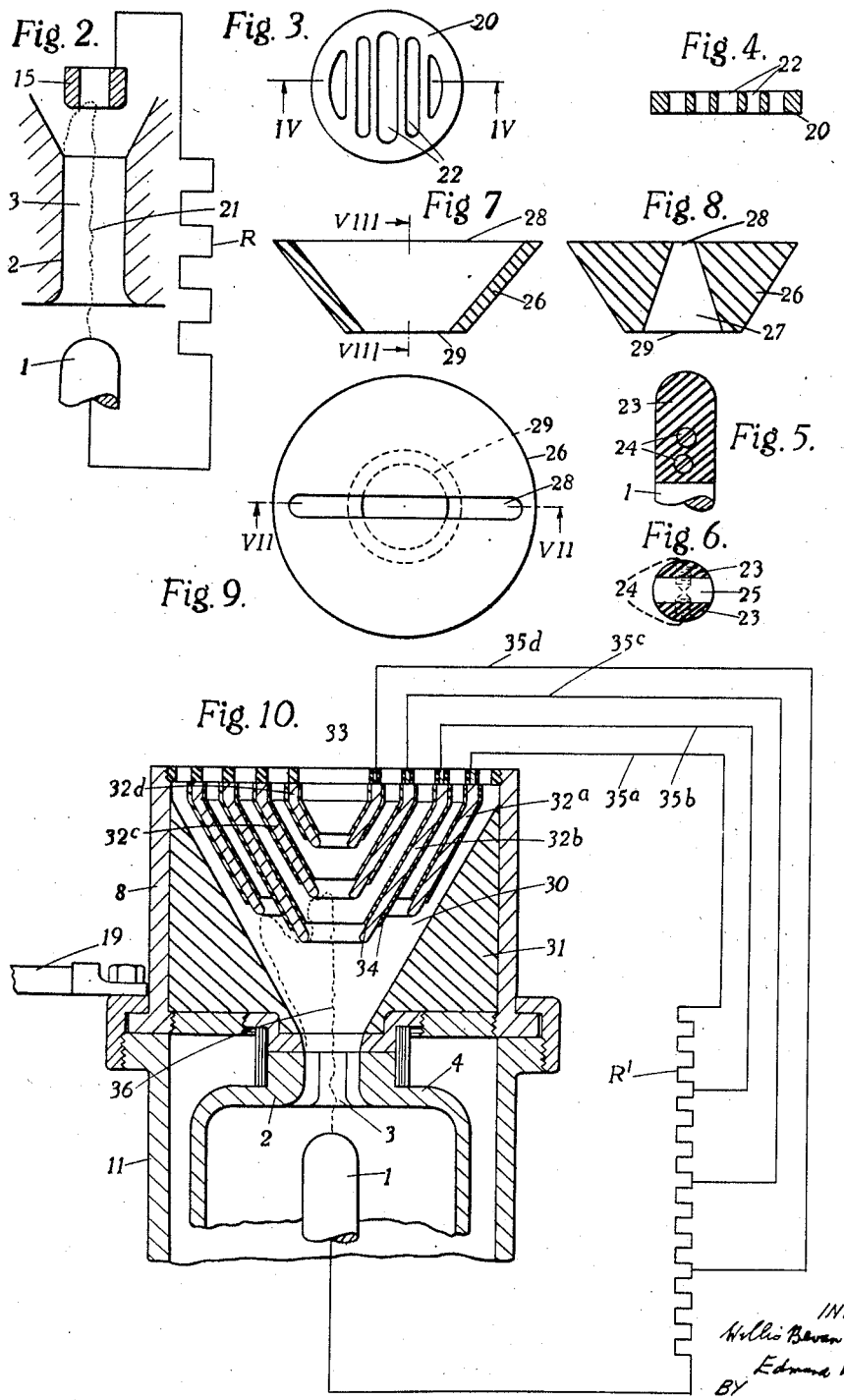

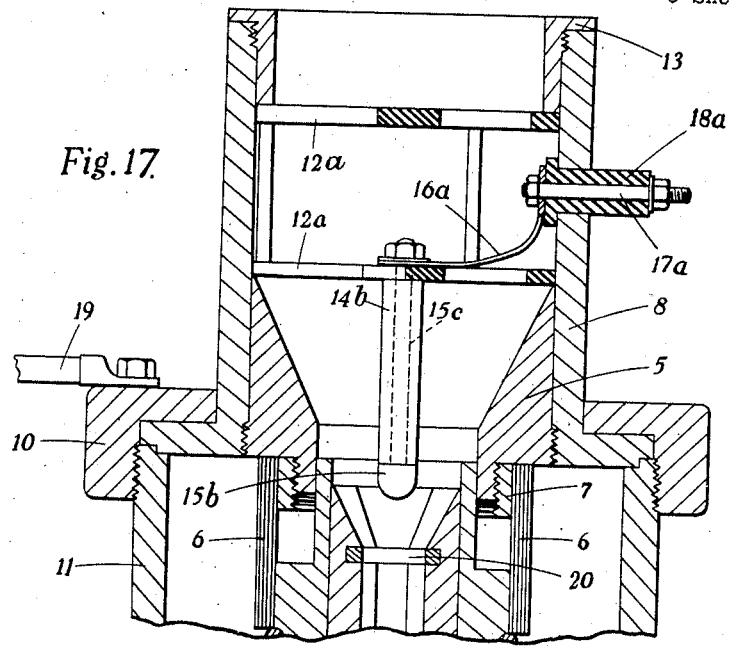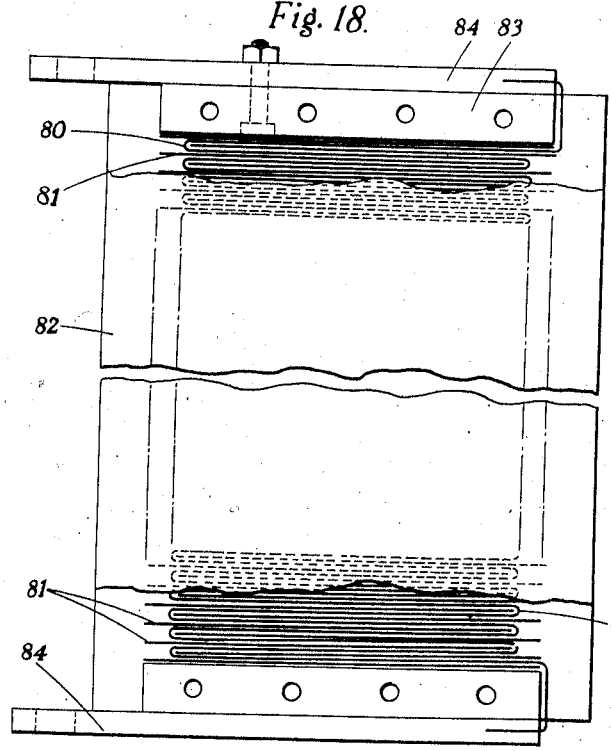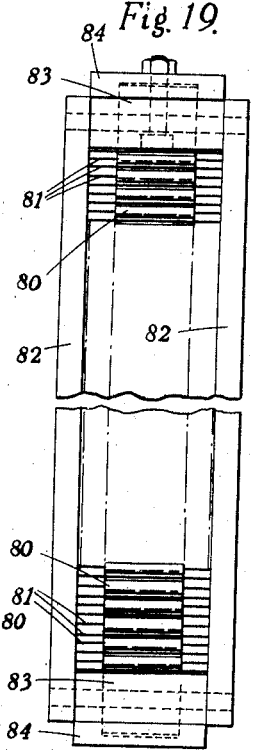

2,141,120

UNITED STATES PATENT OFFICE 2,141,120

ELECTRICAL CIRCUIT INTERRUPTER

Willis Bevan Whitney and Edmund Basil Wedmore, London, England, assignors to The British Electrical & Allied Industries Research Association, London, England, a corporation of Great Britain Application October 30, 1937, Serial No. 171,970
In Great Britain October 31, 1936

32 Claims. (Cl. 200—146)

This invention is concerned with electrical circuit interrupters arranged for a blast of gas, vapour or liquid to be established across or along the arc path for the purpose of promoting arc extinction, and is particularly applicable to alternating current circuit breakers.

Among the objects which have to be kept in view in the design of a circuit interrupter for alternating or variable current is that it shall be capable of handling the peak current associated with the short circuit kilovolt-amperes for which the apparatus is designed and that the deionizing or other arc extinguishing action when the current is falling near zero shall be as effective and efficient as possible.

In general, as the current rating of a circuit breaker or interrupter increases, the structural requirements to obtain efficiency in the above two directions become increasingly incompatible; this is because the structures best suited for bringing about such conditions in the arc path at or near zero current are—owing to the relatively small dimensions and lightness of parts—least able to withstand the conditions to which they are subjected during the heavy current period of arcing during operation of the interrupter.

It is an object of the invention to set up conditions in the arc gap, when this is carrying a relatively very small current in it, such that reignition is prevented. Owing to the relatively slight release of arc energy at this stage the arc stream can, therefore, be subjected to the extinguishing action of, or its current can be passed through or in contact with, parts or apparatus of much more delicate construction or smaller mass or both than would be necessary to withstand or carry the maximum arc current which the breaker has to deal with prior to rupture.

Hitherto it has been the usual practice to make not only the main arcing electrodes but all those parts of an alternating current circuit breaker which are liable to be touched by the arc, or to which it may come into close proximity, sufficiently robust to withstand for a satisfactory period of service the effects of the arc at the peak value of the heaviest current for which the circuit breaker is rated. In this connection, the determining factor is the value of the arc current during the heavy current portion of the current wave, namely when the current is at or near its peak value. It is clear therefore that a substantial improvement could be effected if the arc at heavy current can be kept away from certain parts of the structure which can then be designed to give optimum efficiency in bringing about the extinguishing action near zero current.

The chief object of the invention is to achieve the above-mentioned improvement with the use of relatively light or delicate components which play their part in assisting arc extinction by acting on the arc stream at or near zero current, but are protected from the effects of the arc at or near maximum current.

Accordingly, the essential features of the invention are that provision is made for confining the arc during the time of heavy current flow, i. e. at or near peak value of the current, within a prescribed region to prevent it from reaching one or more component parts of the circuit interrupter located outside that region and capable of assisting arc extinction but incapable of withstanding satisfactorily the heavy current arc, and that means such as a blast of extinguishing fluid are provided for displacing a portion of the arc on to, or into engagement with, the said component part or parts as the current approaches zero value. A magnetic field may be used for keeping the arc within its allotted region at heavy current. Another method is to provide a grid of metal or insulating material between the region of heavy current arcing and the component part or parts to be protected. The grid may have metallic edges facing the blast and backed by insulating material. The apertures in the grid are made too small for the arc to pass through at heavy current but are of sufficient size to allow passage of the arc near zero current without appreciably impeding the flow of blast fluid.

Yet again, in the case of a fluid blast switch, the throat of an outlet passage through which the fluid blast passes from the region of heavy current arcing can be so dimensioned or shaped as to prevent access of the heavy current arc to the relatively light component part or parts located beyond the throat. The component part or parts in question may consist of one or more baffles of insulating material either with or without a small electrode connected to the series resistance mentioned above. Where several such baffles are used, they can be arranged at various distances from the point of separation of the main arcing electrodes and made thinner as their distance from that point increases, since the arc can only reach the thinner plates as it becomes elongated when the current approaches zero. Other examples of relatively light parts to be protected from the arc at heavy current are supporting insulators, small extra electrodes, resistance wires or strips of high ohmic value, sprayer nozzles and so forth.

According to another feature of the invention, one of a pair of relatively movable electrodes moves along and may largely or wholly close a fluid blast outlet passage or its throat formed in the other electrode or in which the other electrode is situated, and to deal efficiently with the current near zero, is furnished with an extra electrode mounted axially in the fluid blast near to the throat of the outlet passage in the path of flow of the blast fluid, the said extra electrode being insulated from the other two electrodes except for electrical connection to one or other of the other two electrodes by way of a resistance of suitable magnitude.

According to another feature of the invention means are provided in combination, so that an end or ends of a series and a shunted arc in a given circuit may be moved into contact with a structure designed for efficient action on the arc path near zero current by a fluid blast or by a magnetic field or both, so that resistance in parallel with the shunted arc is cut out, while resistance in series with the series arc is increased.

As an example, a component to be protected from the heavy current arc may be an additional electrode which is connected to one of the main arcing electrodes through a non-inductive series resistance. In that case, arrangement is made for the low current arc to be displaced on to the additional electrode in order to bring the series resistance into circuit and thereby promote extinction of the arc.

Early extinction of the shunt arc before current reaches zero in the series arc, followed closely by extinction of the series arc, is facilitated by augmenting the resistance inserted between the two arcs, for example, by arranging for one end of the series arc to be blown on to a series of conducting parts, arranged with increments of resistance between them. Thus, as an elementary example of a case where adjoining ends of the series and shunt arcs are moved in the same direction by a blast, a wire of high resistance can be pictured as bent in U-shape in place of the extra electrode and placed in the blast of fluid, with the arms of the U pointing in the direction towards which the fluid is flowing and the upper end of the right hand arm being connected to the electrode from which the shunt arc flows, the other end being left unconnected. In this arrangement if the series arc is to the left of the U and the shunt arc to the right of it, the left-hand end of the shunt arc will be blown along towards the upper end of the right-hand arm of the U (cutting out resistance) and the right-hand end of the series arc will be blown up the left-hand arm of the U thus putting in resistance between the two arcs and bringing about rapid extinction of the series arc.

The invention will now be described by way of example with reference to the accompanying drawings, in which:—

Figure 1 is a central vertical section through a fluid blast switch incorporating the invention;

Figure 1a is a fragmentary sectional elevation showing the insulating support in the form of an inverted truncated cone with a tubular metal tip constituting the additional electrode;

Figure 2 is a diagram to illustrate the arc extinguishing process;

Figure 3 is a plan on an enlarged scale of one of the parts of the construction shown in Figure 1;

Figure 4 is a section on the line IV—IV of Figure 3;

Figure 5 is a fragmentary elevational view of a form of construction of the tip of the movable electrode;

Figure 6 is a plan view of the construction shown in Figure 5;

Figure 7 is a front sectional elevation on the line VII—VII of Figure 9, Figure 8 a section on the line VIII—VIII of Figure 7, and Figure 9 a plan view of a hollow member of insulating material which may be used for preventing the arc reaching the part or parts to be protected until near current zero;

Figure 10 is a central vertical section through the upper part of a fluid blast switch embodying the invention in another form;

Figure 11 is a fragmentary view showing a method of controlling the arc magnetically in a switch constructed as shown in Figure 10;

Figure 12 is a section on the line XII—XII of Figure 11;

Figure 13 is a fragmentary sectional elevation showing the outlet of a fluid blast switch fitted with a structure in accordance with the invention for assisting arc extinction;

Figure 17 is a fragmentary view of the switch illustrated in Figure 1, fitted with a different type of additional electrode; and Figures 18 and 19 are respectively side and end elevations, partly in section, of a suitable form of resistor for use with the invention.

Figure 14:
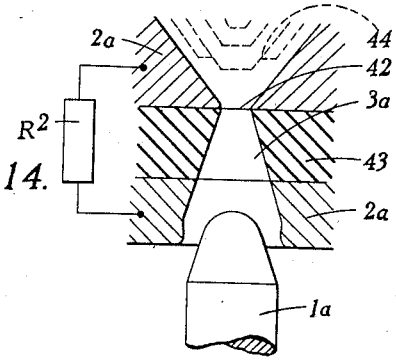
Figure 14 is a fragmentary sectional elevation illustrating another application of the invention to the throat of the outlet of a fluid blast switch.

The fluid blast switch shown in Figure 1 has a movable electrode 1 of about ⅞" diameter which cooperates with a hollow fixed electrode 1 formed with a passageway 3 through which an upward blast of extinguishing fluid is established upon separation of the electrodes 1 and 2. The fixed electrode 2 consists of segments mounted in a segmental shell 4 which is secured to a coned metallic member 5 by means of copper laminations 6 and an internally threaded ring 7. The laminations 6 constitute a resilient current-carrying connection between the ring 7 and the shell 4, and they not only serve as the support for this shell but also serve to carry the current to or from the main electrode 2. the member 5 is screwed into a metal cylinder 8 which forms the outlet passage for the fluid blast. Satisfactory contact between the main electrodes 1 and 2 is assured by the use of a spring 9 around the outside of the segmental shell 4. The cylinder 8 is retained by a ring 10 which is screwed to the casing 11 of the switch. Two spiders 12 of insulating material are rigidly connected together and mounted inside the cylinder 8 so that they rest on top of the coned member 5, and are retained in place by a ring 13 which is screwed into the top of the cylinder 8. The spiders 12 support a hollow cylinder 14 of insulating material fitted at its lower end with a short metal tube 15 constituting an additional electrode which would deteriorate too quickly if repeatedly exposed to the arc at heavy current.

The casing 11 is closed at the bottom by a plate of insulating material 70 held in place by a ring 71 screwed to the casing. The movable electrode 1 is mounted on a cross-bar 72 and passes with a sliding fit through an opening in the base plate 70 and engages with electrically conducting brushes 73 resiliently mounted on a spider 74 of insulating material fixed to the casing 11. The extinguishing fluid is admitted by an inlet 75 to the lower part of the switch.

A connector 16 leads from the electrode 15 upwardly through the wall of the insulating member 14 to a stud 17 mounted in an insulating bushing 18. The stud 17 is connected to a non-inductive resistance R, the other end of which is connected to the brushes 73 through an insulating bushing 76.

The current flows through the switch by way of a connecting lead 19, the fixed contact 2 and the movable electrode 1. When the switch is opened by withdrawing the electrode 1, an arc is struck between the latter and the fixed electrode 2 and is subjected to a blast of gas which is forced past the electrode 1 and up through the passageway 3. This passageway is so dimensioned that its walls short circuit any looping section of the arc during the time of heavy current flow, and tend to prevent the arc at this time from being blown upwardly on to the additional electrode 15. As a further precaution a slotted plate 20 of insulating material, constituting a grid, is mounted as shown a short distance below the electrode 15. The slots in this grid are not sufficiently large to allow the heavy current arc to be forced through them but they allow passage of the arc as the current wave approaches zero value and do not appreciably impede the flow of the blast fluid. The low current arc which is able to pass through the grid 20 is forced by the blast on to the electrode 15 which, as already mentioned, is unable to withstand sufficiently, repeated contact with the heavy current arc. It will be observed that the additional electrode 15 is mounted axially in the fluid blast outlet and is located close to the throat of this outlet.

The action of the arrangement shown in Figure 1 is best explained with reference to Figure 2 in which the grid 20 has been omitted for the sake of clearness. The first thing that happens on opening the switch is that an arc is formed between the main electrodes 1 and 2, and the blast which is established tends to blow this arc up the passageway 3. This, however, can only occur, for the reason already given, when the current is approaching zero value in each cycle, that is to say when the arc stream has contracted considerably. Consequently, owing to the effect of the blast the arc at low current is blown up the passageway 3 on to the additional electrode 15 somewhat in the manner represented by the dotted line 21. The end of the arc which is rooted on the electrode 2 simply travels upwardly over the surface of this electrode and the arc is virtually split into two arcs, one between the electrodes 1 and 15 and the other between the electrodes 2 and 15. In effect, therefore, the resistance R is connected in parallel with the arc between the electrodes 1 and 15 by way of the arc between the electrodes 2 and 15. The result of this is that the arc between the electrodes 1 and 15 is easily quenched at the current zero, leaving the resistance R in series with the electrode 1 and the arc remaining between the electrodes 2 and 15. The insertion of this resistance in series with the arc between the electrodes 2 and 15 reduces the current in the arc and the circuit severity to such a value that the arc is easily extinguished either at the same current zero as the arc which was formed between the electrodes 1 and 15 or at the next current zero, thus completely interrupting the circuit.

It is advantageous to make the additional electrode 15 hollow rather than solid as this ensures that the central vertical portion of the arc stream near zero current will flow to the inside of the cylindrical electrode thus separating any hot gases produced by it from the gap across which the other arc flows. The insulating support 14 may be constructed in the form of an inverted truncated cone 14a, with a tubular metal tip 15a constituting the additional electrode, having a connector 16' leading upwardly through the wall of the insulating member 14a to the stud 17, as illustrated in Figure 1a. Such a construction with an upwardly widening outlet ensures easier escape of the hot gases for any arc entering the hollow electrode 15 than is the case where the outlet passage is cylindrical as it is with the insulating support 14.

After the arc has been finally extinguished, further movement of the movable electrode 1 to its fully open position disconnects it from the resistance R by passage of the electrode 1 below the brushes 73 and thereby forms a suitable gap for insulating purposes.

The construction of the grid 20 with parallel slots 22 is shown clearly in Figures 3 and 4.

Figures 5 and 6 show the preferred method of making the tip of the movable electrode 1 when the grid 20 is used. The tip is recessed on opposite sides and the two recesses are filled with inserts 23 of insulating material which are secured to the electrode by screws 24. The insulating inserts 23 are shaped to conform with the contour of the electrode and the result is that only a central tongue 25 in the middle of the electrode is exposed in the uppermost face of the tip and for some distance along the length of the electrode on opposite sides until the insulation 23 ends.

In practice the movable electrode 1 and the grid 20 are disposed in the relative positions shown in Figures 3 and 6, i. e. with the longer dimension of the tongue 25 in the uppermost face of the tip of the electrode 1 disposed at right angles to the slots 22 in the grid. This arrangement results in the arc being kept in a plane at right angles to the slots 22 and is a further safeguard against an arc at heavy current being able to reach the electrode 15.

Figures 7 to 9 show three views of a device 26 made of insulating material which may be utilized instead of the grid 20 shown in Figure 1 for preventing the arc at heavy current from having access to the electrode 15. This device 26 is formed as an inverted truncated cone and has a central opening 27 which at the top is in the form of a relatively narrow slot 28 and at the bottom 29 is circular, the one cross-section gradually merging into the other. The advantage of this arrangement is that the final outlet area, as represented by the area of the slot 28, is the same as the inlet area 29, but the arc is restricted from bowing until the current approaches zero value owing to the shape of the passage 27.

Figure 10 shows the upper part of a fluid blast switch of somewhat similar construction to that shown in Figure 1, and in this case the outlet passage 30 is formed in an internally coned insulating member 31. The main arcing electrodes 1 and 2 remain as before and the fixed electrode 2 is formed with a passageway 3 for the escape of the fluid blast, this passageway being so dimensioned as to prevent passage of the arc at heavy current. The additional electrode 15 of Figure 1 is replaced by four metallic baffles 32a, 32b, 32c and 32d which are roughly in the shape of inverted truncated cones and are arranged concentrically on a supporting spider 33 of insulating material which is screwed into the cylindrical part 8 of the switch structure. The baffles 32a ... 32d are provided on their inner and outer surfaces with a sheathing 34 of insulating material which stops just short of the lower end of each baffle so as to leave a projecting rim of metal.

The baffles 32a ... 32d are connected by leads 35a, 35b, 35c and 35d respectively to tappings on a non-inductive resistance $R^1$, the other end of which is connected to the main arcing electrode 1. It will be noticed that the outermost baffle 32a has most resistance connected between it and the electrode 1, whereas the innermost baffle 32d has least resistance connected between it and the electrode 1.

When the switch is opened an arc is first formed between the electrodes 1 and 2, but owing to the shaping or dimensioning of the passageway 3 the arc cannot pass upwardly through this passageway during the time of heavy current flow. As an additional safeguard, if desired the grid 20 of Figure 1 or the member 26 of Figure 7 may be provided at the top of the passageway 3 in the switch shown in Figure 10.

Figure 11 is a fragmentary sectional elevation and Figure 12 a section on the line XII—XII of Figure 11 showing a method of magnetically preventing the arc from bowing upwardly into the outlet 30 (Figure 10) during the time of heavy current flow. Figure 11 shows the segmental shell 4 of Figure 10 fitted with iron laminations 77 which are U-shaped in plan as seen in Figure 12. The magnetic force exerted tends to prevent bowing of the arc at heavy current by drawing the arc to one side and so causing it to be short-circuited upon itself. However, as the current approaches zero the magnetic force exerted on the arc is diminished to such an extent that the upward force exerted by the blast of fluid preponderates and carries the low current arc up through the passageway 3 and into the outlet 30 (Figure 10), so that the arc is extended somewhat as indicated at 36.

This arrangement with magnetic material is also particularly suitable for use in the switches shown in Figures 1 and 10. First of all the low current arc is blown up on to the lowermost baffle 32b (Figure 10), thus forming in effect two arcs, one between the electrode 2 and the baffle 32b and the other between this baffle and the electrode 1. The result is that a section of the resistance $R^1$ is connected in parallel with the part of the arc between the electrode 1 and the baffle 32b. As the arc is blown further up the passage 30 it will come into contact with the baffles 32a and 32c somewhat as indicated by the path 36. As a result, sections of the resistance $R^1$ are connected in parallel with the arcs formed between the baffles 32a and 32b, and between 32b and 32c which will effectively extinguish these and leave two portions of arc, one between the electrode 2 and the baffle 32a and the other between the electrode 1 and the baffle 32c. The latter now has less resistance connected in parallel with it than when the arc was formed on the lowermost baffle 32b whilst at the same time a section of resistance is added in series with the portion of the arc between 2 and 32a and the arc between 1 and 32c. Similarly, further upward movement of the arc transfers it to the exposed metallic rim of the baffle 32d, thus further reducing the parallel resistance and increasing the series resistance. The arc now between the baffle 32d and the electrode 1 will be extinguished owing to the low resistance in parallel with it, and the whole of the resistance $R^1$ will be left in series with the remaining portion of the arc between 2 and 32a by way of the electrode 1, and this arc can now be readily extinguished either at the same current zero as the arc between 1 and 32d or at the following current zero.

The introduction of further baffles outside the lowermost baffle 32b increases the number of steps which increase the series resistance, whilst the addition of baffles inside the lowermost one will increase the number of steps decreasing the parallel resistance.

Although the resistance $R^1$ is shown as being connected to the movable electrode 1, it may equally well in some cases be connected to the fixed electrode 2 by removing the section of the resistance and its lead between 1 and 35d, and connecting them between 2 and 35a.

Figure 13 is a fragmentary view in sectional elevation showing the outlet passage 30 of a fluid blast switch, fitted with a series of baffles 32e, 32f, 32g, 32h and 32i of insulating material which are roughly in the shape of inverted truncated cones and are mounted on a spider 37 of insulating material in a conical outlet 31 also of insulating material. It will be seen that the general arrangement of the baffles 32e ... 32i is similar to that of the metallic baffles shown in Figure 10, but in the present instance the baffles 32e ... 32i are purely of insulating material.

During the time of heavy current flow the arc is prevented from being blown upwardly from the passageway 3 by the small dimensions of this passageway, but as the current decreases the arc is blown upwardly on to the lowermost baffle 32g which is made sufficiently thick to withstand the arc which can reach it, the aperture 38 in this baffle being of such a size as to prevent the entry of an arc of more than a given current value because any tendency to loop will result in the sides of the loop touching and short-circuiting. The nearer the current approaches zero the further is the arc bowed up the passageway 30 and so reaches the next lowest cone 32f or 32h each of which is made thinner than the baffle 32g. The sizes of the aperture 39 and of the annular spaces 40, 41 are such as to prevent further bowing of the arc until the current has decreased sufficiently to enable the arc to be blown further up the passage 30. The further the baffles are away from the region of heavy current arcing, the thinner they can be made and thus a greater number of baffles can be used without unduly restricting the total outlet area than would be the case if they were all made of sufficient thickness to resist the effects of the heaviest current arcs. This arrangement of insulating baffles 32e ... 32i assists in arc extinction since portions of the arc near zero current are held against the edges of the baffles and blown by the blast into the annular spaces between the baffles, thereby greatly lengthening and cooling the arc path at a time when the energy available for maintaining the temperature is small. In this case the lowest baffle 32g can be made of such dimensions as to be capable of withstanding the heavy current arc and so protecting the thinner baffles 32e, 32f, 32h and 32i.

Figure 14 is a fragmentary view of an arrangement in which the outlet passage 3a in the fixed electrode 2a is tapered towards its throat 42, and the tip of the movable electrode 1a is shaped correspondingly. Extending downwardly from the throat there is a barrier 43 of insulating material dividing the electrode 2a into two parts which are connected together through a non-inductive resistance $R^2$. The component parts which are to be protected from the arc at heavy current are positioned above the throat 42 as indicated diagrammatically at 44.

As the arc approaches current zero it is elongated along the face of the barrier 43 and eventually the upper root of the arc, which was on the lower part of the electrode 2a, is transferred to the upper part of that electrode above the throat 42, thereby inserting the resistance $R^2$ in series with the electrodes 1a and 2a. The low current arc is further elongated by being forced by the blast up on to the baffles 44 which may either be of plain insulating material, as shown in Figure 13, or arranged as shown in Figure 10 so as to connect sections of a non-inductive resistance in parallel and in series with a branch of the arc.

In each of the switches so far described a fluid blast is established, upon separation of the main arcing electrodes, which flows over the tip of the movable electrode and through a passageway in the fixed electrode. This does not apply in the case of the switch shown in Figures 15 and 16 which is constructed so as to operate in accordance with the invention disclosed in Patent Specification No. 1,981,404 (The British Electrical and Allied Industries Research Association). This form of switch has a metallic container 45 fitted with a base plate 46 of insulating material which is held in place by a screw-threaded ring 47 of metal, the movable electrode 48 passing with a sliding fit through an opening 49 in the base plate and through an opening in a packing gland 50.

The fixed electrode 51 is of the socket type and consists of four contact fingers resiliently mounted on an extension 52 of the lead-in 53, the latter passing through an insulator 54. The extension 52 has a screw-threaded boss 53a which is screwed into a cover plate 55 of insulating material. A stack of baffle plates, composed of repeated and similarly constituted groups of plates 56, 57 and 58 of insulating material, is provided inside the container 45 and held firmly in place by a cylindrical ring 59 of insulating material which is pressed down by screwing the cover plate 55 into position.

Figure 16:
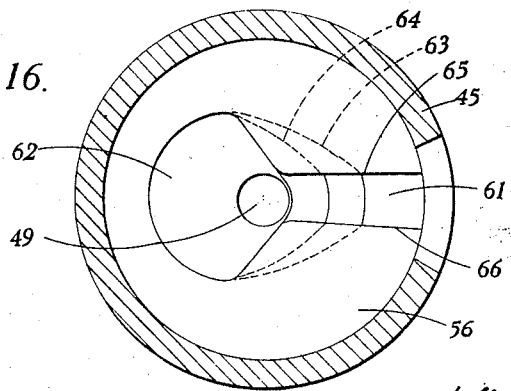
Figure 16 is a section on the line XVI—XVI of Figure 15.

All the baffle plates 56, 57, 58 are spaced apart by thin spacing plates 60, so that a very shallow gap 61 is left between neighbouring plates. It will be noticed that the plates 56 are thicker than the plates 58 and the latter in turn are thicker than the plates 57. Moreover, the baffle plates 56, 57 and 58 are formed with approximately fan-shaped openings 62, 63 and 64 respectively. The shape of the opening 62 in the uppermost plate 56 is shown in Figure 16 and it is to be noted that this plate is solid except for this opening. The openings 63, 64 are of similar shape to the opening 62 but they extend further to the right of the line of electrode separation, and it will be seen that the opening 63 in the thinnest plates 57 is the one which extends most to the right.

The thin spacing plates 60 each have a fan-shaped opening similar to the opening 62, but which merges into the shallow outlet slot 61. These slots are relatively narrow as seen in plan, and in fact the slots in question are bounded by the lines 65, 66 seen in Figure 16. These narrow and shallow superposed outlet slots all discharge in one general direction transversely to, and away from, the path of separation of the electrodes 48 and 51, and the container 45 is provided with a lateral opening 67 in registration with the outlet slots 61. It will be noted that the openings 62, 63 and 64 in the various baffle plates extend further to the right and more towards the outlet slots 61 in proportion as the plates are thinner.

Figure 15:
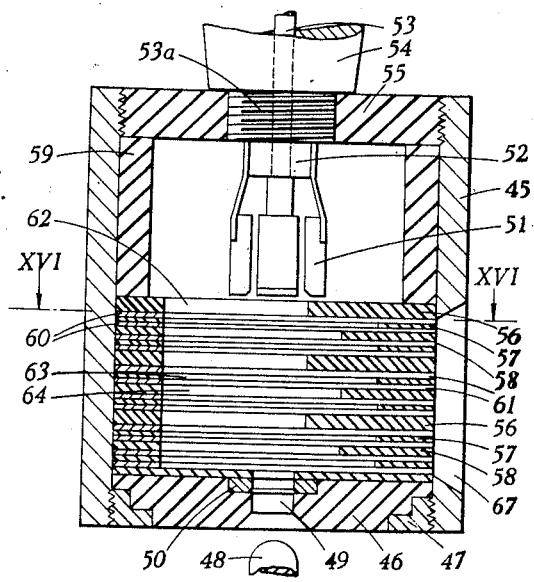
Figure 15 is a central vertical section through a form of circuit breaker in which the arc is drawn through a stack of baffle plates with lateral outlets for the arc products.

In operation the entire switch unit shown in Figures 15 and 16 is submerged in an oil tank (not shown), and when the electrodes 48 and 51 are separated the resulting arc vaporizes some of the surrounding oil so that the arc becomes enclosed in a bubble of gas. Owing to the particular arrangement of the lateral outlets 61 on one side of the path of electrode separation, a pressure gradient is established which causes the products of arcing to escape through the lateral outlets in one general direction and at the same time displaces the arc towards the throats of these outlets.

It is clear that the arc will first of all be displaced into engagement with the right-hand edge of the opening 62 in the uppermost of the thickest baffle plates 56. If the arc attempts to travel any further to the right during the time of heavy current flow it will short circuit on itself because its diameter is relatively large at this time. In other words, the arc at heavy current will not be able to reach the baffle plates 57, 58 located between the thick plates 56. However, as the current reduces in value the arc can be urged first into contact with the plates 58 and as the current decreases still further the arc can be displaced into engagement with the thinnest plates 57. Matters are so arranged that the arc can only come into contact with the thinnest plates 57 when it is very nearly at zero current. This arrangement materially assists in rupturing the arc since it is progressively lengthened as the current decreases, and all the time it is held in the throats of the outlet slots where it is exposed to the full effect of the blast. Moreover, by decreasing the thickness of the baffle plates as their fan-shaped openings lie further away from the line of electrode separation, the total outlet area is made greater for given dimensions than would be the case if the baffle plates were all of the same thickness and with the right-hand edges of their openings 62, 63 and 64 at the same distance away from the line of electrode separation.

The construction shown in Figures 15 and 16 may be modified by fitting some or all of the baffle plates 56, 57, 58 with metal tips at the right hand edge of the fan-shaped opening in each plate and these metal tips may be connected to the electrodes 48 or the electrode 51 through non-inductive resistances as described above in connection with Figure 10.

Successful tests have been carried out with arrangements in which the additional electrode is in the form of a solid rod with streamlined tip disposed axially in the fluid blast outlet, and also in which it is tubular as shown at 15 or 15a in Figure 1. In both cases the surfaces exposed to the blast beyond the arcing tip were protected from the arc by insulating material which in the case of these experiments was wood. Figure 17 shows a streamlined additional electrode 15b of solid copper disposed axially in the fluid blast outlet and mounted on a brass stud 15c which is supported on a spider 12a and has a connector 16a fixed to a stud 17a which is mounted in an insulating bushing 18a. A cylindrical sleeve 14b, of teak, surrounds the stud 15c and serves to protect the part of the additional electrode, beyond its arcing tip 15b, from the arc. The tests were carried out with the additional electrode 15 or 15b at different positions along the axis of the outlet passage for the blast fluid. In one test in which the additional electrode was tubular, as shown at 15 in Figure 1, and was set with a gap between it and the wall of the outlet passage of 5.5 millimetres, a non-inductive resistance of 80 ohms was connected between the moving electrode 1 and the additional electrode 15, and a current of 1,600 amperes at 6,600 volts from a 10,000 kilowatt alternator was extinguished in the highly inductive circuit containing the main arcing electrodes 1 and 2. The gap between the latter was 1.5 centimetres when the arc was finally extinguished, at which stage the electrodes had reached a pause in their separating movement. In the above case a blast pressure above atmospheric pressure of only approximately ½ that required with practically the same apparatus and circuit, but with the additional electrode 15 insulated from the main arcing electrodes, was required to extinguish the arc. In this test the arc between the main stationary electrode 2 and the additional electrode 15 was reduced to approximately 80 amperes before rupture. Since the gap between the additional electrode and the stationary electrode is small, the movable electrode is preferably finally withdrawn clear of its connection to the resistance after the arc at the additional electrode is extinguished, in order to provide a permanent insulating gap.

Further tests on a current of nearly 5,000 amperes showed approximately the same ratio of improvement as at 1,600 amperes.

In all the above experiments the fluid blast was intentionally inefficient, and even smaller blast pressure than that mentioned above could have been used with consequent saving, if more normal arrangements had been employed in the tests.

Tests were also made with non-inductive resistances of 40, 160 and 320 ohms. The resistances were made up of 40 ohm units in each of which the resistance material used was nichrome V-tape, 0.75" wide and 0.004" thick having a length of approximately 240 feet. The construction of one of such 40 ohm units is shown in Figures 18 and 19. A strip 80 of the aforesaid tape is arranged in zig-zag formation, each limb being 3¾" long, and a mica sheet 81, 4" long, 1¼" wide and 0.004" thick is inserted in each angle, leaving ¼" of mica projecting on either side and ¾" at one end to prevent flash-over between turns. The whole is then arranged between fibre side plates 82 and compressed between fibre end pieces 83 which are bolted to the plates 82 as soon as a suitable overall length is obtained. The ends of the strip are then brought up to copper lugs 84 which, in turn, are clamped to the fibre end pieces 83 and used as terminals. The total number of mica strips employed in this unit was 760, and the total weight of the resistance material approximately 2½ pounds. The conducting link in series with the 40 ohms resistance has an inductance of 10 microhenries. The inductance of the resistance unit itself was probably less.

We claim:—

1. An electric circuit interrupter for current which varies in magnitude during interruption, comprising in combination, a switch structure, relatively movable electrodes mounted to separate within said structure, means for confining the arc formed upon separating said electrodes to a prescribed region within said structure when the varying current is at a relatively high value, at least one component part of said interrupter located outside said region and capable of assisting arc extinction but incapable of satisfactorily withstanding the effect of the arc at heavy current flow, and means for displacing a portion of the arc into contact with said component part as the current decreases toward zero value.

2. An electric circuit interrupter for current which varies in magnitude during interruption, comprising in combination, a switch structure, relatively movable electrodes mounted to separate within said structure, means for confining the arc formed upon separating said electrodes to a prescribed region within said structure when the varying current is substantially at maximum value, component parts of said interrupter located outside said region and capable of assisting arc extinction but incapable of satisfactorily withstanding the effect of the arc at heavy current flow, and means for displacing a portion of the arc into engagement with said component parts as the current decreases towards zero value.

3. An electric circuit interrupter for current which varies in magnitude during interruption, comprising in combination, a switch structure, relatively movable electrodes mounted to separate within said structure, means for establishing a blast of arc extinguishing fluid through the arc gap formed upon separating said electrodes, said structure having an outlet passage for the escape of said fluid blast formed with a throat adjacent said arc gap, and a component part of said interrupter located in said outlet passage and capable of assisting arc extinction but incapable of withstanding satisfactorily the effect of the arc at heavy current flow, said outlet throat being so designed as to prevent the arc at heavy current from reaching said component part, said fluid blast displacing a portion of the arc through said outlet throat and into contact with said component part as the current decreases towards zero value.

4. An electric circuit interrupter for current which varies in magnitude during interruption, comprising in combination, a switch structure, relatively movable electrodes mounted to separate within said structure, a grid located in said structure near one of said electrodes, said grid preventing the arc formed upon separating said electrodes from passing therethrough at heavy current flow but allowing passage of the arc as the current decreases towards zero value, a component part of said interrupter positioned so as to be isolated by said grid from the arc at heavy current flow, said component part being capable of assisting arc extinction but incapable of satisfactorily withstanding the effect of the heavy current arc, and means for displacing part of the arc through said grid and into contact with said component part as the current decreases towards zero value.

5. An electric circuit interrupter for current which varies in magnitude during interruption, comprising in combination, a switch structure, relatively movable electrodes mounted to separate within said structure, a plate of insulating material having parallel slots therethrough located in said structure adjacent one of said electrodes, said slotted plate constituting a grid of such a character as to prevent the arc formed upon separating said electrodes from passing therethrough at heavy current but allowing passage of the arc near zero current, means for keeping the arc at heavy current in a plane substantially at right angles to the lengths of said slots, a component part of said interrupter positioned so as to be isolated by said grid from the arc at heavy current flow, said component part being capable of assisting arc extinction but incapable of satisfactorily withstanding the effect of the heavy current arc, and means for displacing part of the arc through said grid and into contact with said component part as the current decreases towards zero value.

6. An electric circuit interrupter for current which varies in magnitude during interruption, comprising in combination, a switch structure, relatively movable electrodes mounted to separate within said structure, means for establishing a blast of arc extinguishing fluid through the arc gap formed upon separating said electrodes, said structure having an outlet passage for the escape of said fluid blast formed with a throat adjacent said arc gap, said throat being designed to prevent the arc at heavy current from entering said outlet passage to any material extent, a grid having suitably dimensioned slots therethrough positioned to co-operate with said throat in preventing the heavy current arc from passing into said outlet passage, and a component part of said interrupter mounted in said outlet passage and capable of assisting arc extinction but incapable of satisfactorily withstanding the effect of the heavy current arc, said fluid blast acting to displace part of the arc through said outlet throat and slots into contact with said component part as the current decreases towards zero value.

7. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, an additional electrode positioned outside said region and incapable of satisfactorily withstanding contact with the arc at heavy current, a resistance connected between said additional electrode and one of said main arcing electrodes, and means for displacing the arc on to said additional electrode as the current nears zero value.

8. An electric circuit interrupter for current which varies in magnitude during interruption, comprising in combination, a switch structure, a pair of relatively movable arcing electrodes mounted to separate within said structure, means for establishing a blast of arc extinguishing fluid through the arc gap formed upon separating said electrodes, said structure having an outlet passage for the escape of said fluid blast formed with a throat adjacent said arc gap, said throat being designed to prevent the arc at heavy current from entering said outlet passage to any material extent, a grid having suitably dimensioned slots therethrough positioned to co-operate with said throat in preventing the heavy current arc from passing into said outlet passage, an additional electrode mounted in said outlet passage and incapable of satisfactorily withstanding contact with the heavy current arc, and a resistance connected between said additional electrode and one of said arcing electrodes, said fluid blast acting to transfer part of the arc through said outlet throat and slots on to said additional electrode as the current approaches near zero value.

9. An electric circuit interrupter for current which varies in magnitude during interruption, comprising in combination, a switch structure, a pair of relatively movable arcing electrodes mounted to separate within said structure, means for establishing a blast of arc extinguishing fluid through the arc gap formed upon separating said electrodes, said structure having an outlet passage for the escape of said fluid blast formed with a throat adjacent said arc gap, said throat being designed to prevent the arc at heavy current from entering said outlet passage to any material extent, a grid having suitably dimensioned slots therethrough positioned to co-operate with said throat in preventing the heavy current arc from passing into said outlet passage, a tubular additional electrode mounted axially in said outlet passage near the inner end thereof, said additional electrode being incapable of satisfactorily withstanding contact with the heavy current arc, and a resistance connected between said additional electrode and one of said arcing electrodes, said fluid blast acting to transfer part of the arc through said outlet throat and slots on to said additional electrode as the current approaches near zero value.

10. An electric circuit interrupter for current which varies in magnitude during interruption, comprising in combination, a switch structure, a pair of relatively movable arcing electrodes mounted to separate within said structure, means for confining the arc formed upon separating said electrodes to a prescribed region within said structure during the time of heavy current flow, said structure having an outlet passage for the escape of products of arcing, an insulating member in the form of an inverted hollow truncated cone mounted inside said outlet passage, an additional electrode mounted on the lower end of said cone outside said prescribed region, said electrode being incapable of satisfactorily withstanding contact with the heavy current arc, a resistance connected between said additional electrode and one of said arcing electrodes, and means for transferring the arc on to said additional electrode as the current approaches near zero value.

11. An electric circuit interrupter for current which varies in magnitude during interruption, comprising in combination, a switch structure, a stationary electrode and a co-operating movable electrode mounted to separate within said structure, a plate having parallel slots therethrough located in said structure adjacent said stationary electrode, said slotted plate constituting a grid of such a character as to prevent the arc formed upon separating said electrodes from passing therethrough at heavy current flow but allowing passage of the arc near zero current, the tip of said movable electrode being formed with recesses on opposite sides, insulating material filling said recesses so that only a central tongue of metal is exposed in said tip, the longer dimension of said tongue in the uppermost face of said tip being disposed at right angles to the slots in said grid for the purpose specified, a component part of said interrupter positioned so as to be isolated by said grid from the arc at heavy current flow, said component part being capable of assisting arc extinction but incapable of satisfactorily withstanding the effect of the heavy current arc, and means for displacing part of the arc through said grid and into contact with said component part as the current decreases towards zero value.

12. An electric circuit interrupter for current which varies in magnitude during interruption, comprising in combination, a switch structure, relatively movable electrodes mounted to separate within said structure, a component part of said interrupter capable of assisting to extinguish the arc formed upon separating said electrodes but incapable of satisfactorily withstanding the effect of the arc at heavy current, a barrier of insulating material disposed between said component part and the point of commencement of arcing designed to prevent the arc at heavy current from reaching said component part, said barrier being formed with a through passageway the cross-section of which varies progressively from circular at the end nearest the region of heavy current arcing to slot-like at the end nearest said component part, and means acting to displace the arc through said passageway and into contact with said component part as the current approaches near zero value.

13. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, said structure being formed with an outlet for the products of arcing, a plurality of baffles of insulating material mounted in said outlet and positioned outside said region, said baffles being approximately in the form of hollow inverted truncated cones of different sizes disposed co-axially, and means for displacing the arc into engagement with said baffles as the current nears zero value.

14. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, said structure being formed with an outlet for the products of arcing, a plurality of baffles of insulating material mounted in said outlet and positioned outside said region, said baffles being approximately in the form of hollow inverted truncated cones of different sizes disposed co-axially one inside another and arranged to extend downwardly for various distances in said outlet and made thicker the nearer they approach said region, and means for displacing the arc into engagement with said baffles as the current nears zero value.

15. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, said structure being formed with an outlet for the arc products, a plurality of metallic baffles mounted in said outlet and positioned outside said region, said baffles being approximately in the form of hollow inverted truncated cones of different sizes disposed co-axially one inside another, an insulating sheathing covering the inner and outer surfaces of said baffles except at their lower ends where the metal is left exposed, one or more sections of non-inductive resistance connected between said baffles and one of said main arcing electrodes, and means for transferring the arc on to the lower ends of said baffles as the current nears zero value.

16. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, said structure being formed with an outlet for the arc products, a plurality of metallic baffles mounted in said outlet and positioned outside said region, said baffles being approximately in the form of hollow inverted truncated cones of different sizes disposed co-axially one inside another, arranged to extend downwardly for various distances in said outlet and made thicker the nearer they approach said region, an insulating sheathing covering the inner and outer surfaces of said baffles except at their lower ends where the metal is left exposed, one or more sections of non-inductive resistance connected between said baffles and one of said main arcing electrodes, and means for transferring the arc on to the lower ends of said baffles as the current nears zero value.

17. An electric circuit interrupter for current which varies in magnitude during interruption, comprising in combination, a switch structure, relatively movable electrodes mounted to separate within said structure, means for establishing a blast of arc extinguishing fluid through the arc gap formed upon separating said electrodes, said structure having an outlet passage for the escape of said fluid blast formed with a throat adjacent said arc gap, said throat being designed to prevent the arc at heavy current from entering said outlet passage to any material extent, and a plurality of baffles of insulating material mounted in said outlet passage out of reach of the heavy current arc, said baffles being approximately in the form of hollow inverted truncated cones disposed co-axially, said fluid blast acting to displace the arc into engagement with said baffles as the current decreases towards zero value.

18. An electric circuit interrupter for current which varies in magnitude during interruption, comprising in combination, a switch structure, relatively movable electrodes mounted to separate within said structure, means for establishing a blast of arc extinguishing fluid through the arc gap formed upon separating said electrodes, said structure having an outlet passage for the escape of said fluid blast formed with a throat adjacent said arc gap, said throat being designed to prevent the arc at heavy current from entering said outlet passage to any material extent, a plurality of metallic baffles mounted in said outlet passage out of reach of the heavy current arc, said baffles being approximately in the form of hollow inverted truncated cones disposed co-axially, an insulating sheathing covering the inner and outer surface of said baffles except at their lower ends where a rim of metal is left exposed, and one or more sections of non-inductive resistance connected between said baffles and one of said electrodes, said fluid blast acting to transfer the arc on to the lower ends of said baffles as the current nears zero value.

19. An electric circuit interrupter for current which varies in magnitude during interruption, comprising in combination, a switch structure, a stationary electrode and a co-operating movable electrode mounted to separate within said structure, a barrier of insulating material dividing said stationary electrode into two electrically-conductive parts, a resistance connecting together said two parts, means for confining the arc formed upon separating said electrodes to a prescribed region in said structure at heavy current flow, a component part of said interrupter located outside said region and capable of assisting arc extinction but incapable of satisfactorily withstanding the arc at heavy current, and means for displacing the arc into engagement with said component part as the current approaches near zero value, and simultaneously transferring the arc from the one to the other of said two conductive parts, whereby said resistance is inserted in series with said stationary electrode and said movable electrode.

20. An electric circuit interrupter for current which varies in magnitude during interruption, comprising in combination, a switch structure, a stationary electrode and a co-operating movable electrode mounted to separate within said structure, means for establishing a blast of arc extinguishing fluid through the arc gap formed on separating said electrodes, said structure being formed with an outlet for the escape of said fluid blast, a barrier of insulating material dividing said stationary electrode into two electrically-conductive parts, a resistance connecting together said two parts, means for preventing the arc at heavy current flow from entering said outlet to any material extent, and a component part of said interrupter capable of assisting arc extinction located in said outlet beyond reach of the heavy current arc, said fluid blast acting to displace the arc near current zero into contact with said component part and simultaneously to transfer the arc from the one to the other of said two conductive parts, whereby said resistance is inserted in series with said stationary electrode and said movable electrode.

21. An electric circuit interrupter for current which varies in magnitude during interruption, comprising in combination, a switch structure, a stationary electrode and a co-operating movable electrode mounted to separate within said structure, said stationary electrode having an approximately conical through passageway formed with a throat, an insulating barrier dividing said stationary electrode into two electrically-conductive parts, a resistance connecting together said two parts, said barrier extending from said throat towards the arc gap formed upon separating said electrodes, said throat serving to confine the arc at heavy current flow to a prescribed region in said structure, a component part of said interrupter located outside said region and capable of assisting arc extinction but incapable of satisfactorily withstanding the arc at heavy current, and means for displacing the arc into engagement with said component part as the current approaches near zero value, and simultaneously transferring the arc from the one to the other of said two conductive parts, whereby said resistance is inserted in series with said stationary electrode and said movable electrode.

22. An electric circuit interrupter for current which varies in magnitude during interruption, comprising in combination, a switch structure, a stationary electrode and a co-operating movable electrode mounted to separate within said structure, means for establishing a blast of arc extinguishing fluid through the arc gap formed on separating said electrodes, said structure being formed with an outlet for the escape of said fluid blast, said stationary electrode having an approximately conical passageway therethrough formed with a throat leading into said outlet, an insulating barrier dividing said stationary electrode into two electrically-conductive parts, a resistance connecting together said two parts, said barrier extending from said throat towards the arc gap formed upon separating said electrodes, said throat serving to prevent the arc at heavy current flow from entering said outlet to any material extent, and a component part of said interrupter capable of assisting arc extinction located in said outlet beyond reach of the heavy current arc, said fluid blast acting to displace the arc near current zero into contact with said component part and simultaneously to transfer the arc from the one to the other of said two conductive parts, whereby said resistance is inserted in series with said stationary electrode and said movable electrode.

23. An electric circuit interrupter for current which varies in magnitude during interruption, comprising in combination, a switch structure, relatively movable electrodes mounted to separate within said structure, a component part of said interrupter capable of assisting extinction of the arc formed upon separating said electrodes but incapable of satisfactorily withstanding the effect of the arc at heavy current flow, magnetic material provided intermediate the point of commencement of arcing and said component part, said magnetic material being arranged to cause the arc at heavy current flow to be forced to one side and be short-circuited on itself thereby preventing the heavy current arc from reaching said component part, and means for displacing the arc at low current into contact with said component part.

24. An electric circuit interrupter for current which varies in magnitude during interruption, comprising in combination, a container for oil, relatively movable arcing electrodes mounted to separate within said container, and a stack of superposed baffle plates each having an opening therein surrounding the arc gap formed upon separating said electrodes, said stack being formed with narrow outlet slots between pairs of said baffle plates leading in one general direction transversely away from the line of electrode separation, and serving for the escape of arc products, said stack being composed of groups of said plates of various thicknesses arranged so that the openings in said plates extend further away from the line of electrode separation and towards said outlet slots according as said plates are thinner, the thicker ones of said plates co-operating to prevent the arc from reaching the thinner ones of said plates until the current approaches near zero value.

25. An electric circuit interrupter for current which varies in magnitude during interruption, comprising in combination, a container for oil, relatively movable arcing electrodes mounted to separate within said container, a stack of superposed baffle plates each having an opening therein surrounding the arc gap formed upon separating said electrodes, said stack being formed with narrow outlet slots between pairs of said baffle plates leading in one general direction transversely away from the line of electrode separation, and serving for the escape of arc products, said stack being composed of groups of said plates of various thicknesses arranged so that the openings in said plates extend further away from the line of electrode separation and towards said outlet slots according as said plates are thinner, the thicker ones of said plates co-operating to prevent the arc from reaching the thinner ones of said plates until the current approaches near zero value, a metal tip disposed at that edge of the opening in at least one of said baffle plates which lies nearer said outlet slots, and a non-inductive resistance connected between said metal tip and one of said arcing electrodes.

26. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, an additional electrode positioned outside said region and incapable of satisfactorily withstanding contact with the arc at heavy current, an electrically-conductive brush mounted in said structure to bear resiliently against one of said electrodes which is movable, a resistance connected between said brush and said additional electrode, and means for displacing the arc at low current on to said additional electrode, said movable arcing electrode being withdrawn from contact with said brush after the arc has been extinguished, whereby said movable electrode is disconnected from said resistance and a suitable gap is provided for insulating purposes.

27. An electric circuit interrupter for current which varies in magnitude during interruption, comprising in combination, a switch structure, a stationary arcing electrode and a co-operating movable arcing electrode mounted to separate within said structure, said stationary electrode being formed with a through passageway so dimensioned as to cause any looping section of the arc formed upon separating said electrodes to be short-circuited upon itself at heavy current flow, said structure being formed within an outlet duct leading directly away from said passageway, a hollow additional electrode of relatively light construction mounted in said outlet duct co-axially with said passageway, a resistance connected between said additional electrode and said movable electrode, and a pipe connection for the supply of arc extinguishing fluid under pressure to the interior of said structure, the blast of said fluid which escapes through said passageway and outlet duct upon separation of said arcing electrodes acting to transfer the arc on to said additional electrode when the current reaches a value near zero.

28. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, said structure having an outlet passage leading away from the point of commencement of arcing, a plurality of baffles of insulating material supported in said outlet passage and positioned outside said region, said baffles being approximately in the form of hollow inverted truncated cones of different sizes disposed co-axially, and a pipe connection for supplying arc extinguishing fluid under pressure to the interior of said structure, the blast of said fluid which escapes through said outlet passage upon separation of said electrodes acting to displace the arc into engagement with said baffles when the current reaches a value near zero.

29. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, said structure having an outlet passage leading away from the point of commencement of arcing, a plurality of metallic baffles mounted in said outlet passage outside said region, said baffles being approximately in the form of hollow inverted truncated cones of different sizes disposed co-axially, an insulating sheathing covering the inner and outer surfaces of said baffles except at their lower ends where a rim of metal is left exposed, a non-inductive resistance connected between each of said baffles and one of said electrodes, and a pipe connection for supplying arc extinguishing fluid under pressure to the interior of said structure, the blast of said fluid which escapes through said outlet passage upon separation of said electrodes arcing to transfer part of the arc on to the lower ends of said baffles as the current reaches a value near zero.

30. An electric circuit interrupter for current which varies in magnitude during interruption, comprising in combination, a switch structure, a pair of relatively movable main arcing electrodes mounted to separate within said structure, means for confining the arc formed upon separating said electrodes to a prescribed region within said structure during the time of heavy current flow, said structure having an outlet passage leading away from the point of commencement of arcing, a plurality of metallic baffles mounted in said outlet passage and outside said region, said baffles being approximately in the form of hollow inverted truncated cones, said cones being of different sizes and arranged concentrically at varying levels, a non-inductive resistance connected between each of said baffles and one of said electrodes, the magnitude of said resistance increasing from the innermost to the outermost of said baffles, and means for establishing a blast of extinguishing fluid through the arc gap formed upon separating said electrodes, said fluid blast acting to transfer part of the arc on to the lower ends of at least some of said baffles as the current decreases to near zero value.

31. An electric circuit interrupter comprising in combination, a switch structure having a passage therein which is formed with a throat, a stationary main arcing electrode, forming at least part of the wall of said throat, and a co-operating movable main arcing electrode mounted to separate within said structure, means for establishing a blast of arc extinguishing fluid through the arc gap formed upon separating said main arcing electrodes and through said passage and throat, the general direction of flow of the blast through said throat being opposed to the direction in which said movable main arcing electrode is withdrawn from said throat, said switch structure being formed with a blast outlet passage on the blast outgoing side of said stationary main arcing electrode, at least one additional electrode located within said blast outlet passage and away from the wall thereof so as to be wholly immersed in the blast, and a resistance connected between said additional electrode and one of said main arcing electrodes, said blast acting to displace the arc against said additional electrode whereby said resistance is connected in circuit with the arc.

32. An electric circuit interrupter comprising in combination, a switch structure having a passage therein which is formed with a throat, a stationary main arcing electrode, forming at least part of the wall of said throat, and a co-operating movable main arcing electrode mounted to separate within said structure, means for establishing a blast of arc extinguishing fluid through the arc gap formed upon separating said main arcing electrodes and through said passage and throat, the general direction of flow of the blast through said throat being opposed to the direction in which said movable main arcing electrode is withdrawn from said throat, said switch structure being formed with a blast outlet passage on the blast outgoing side of said stationary main arcing electrode, an additional electrode mounted substantially centrally in said blast outlet passage and closely adjacent said throat so as to be wholly immersed in the blast issuing from said throat, and a resistance connected between said additional electrode and one of said main arcing electrodes, said blast acting to displace the arc against said additional electrode whereby said resistance is connected in circuit with the arc.

WILLIS BEVAN WHITNEY.
EDMUND BASIL WEDMORE.